Sept. 2, 1941.  E. HOLLOWELL  2,254,655
AUTOMOBILE TIRE PRESSURE RELIEF VALVE
Filed Sept. 20, 1939
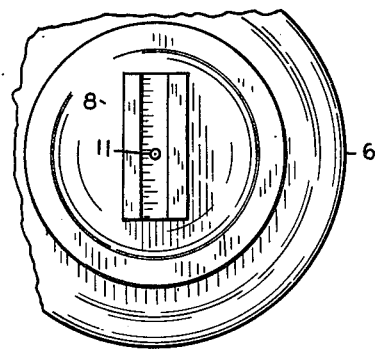
FIGURE 2.
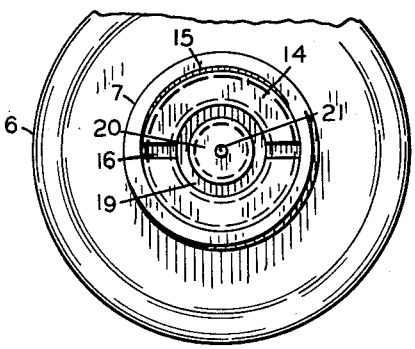
FIGURE 3.
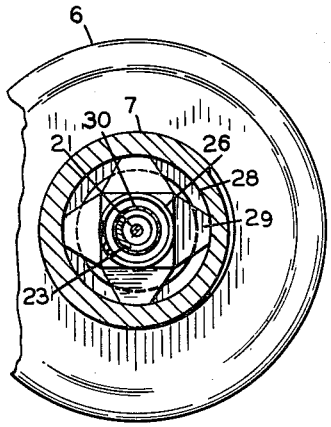
FIGURE 4.
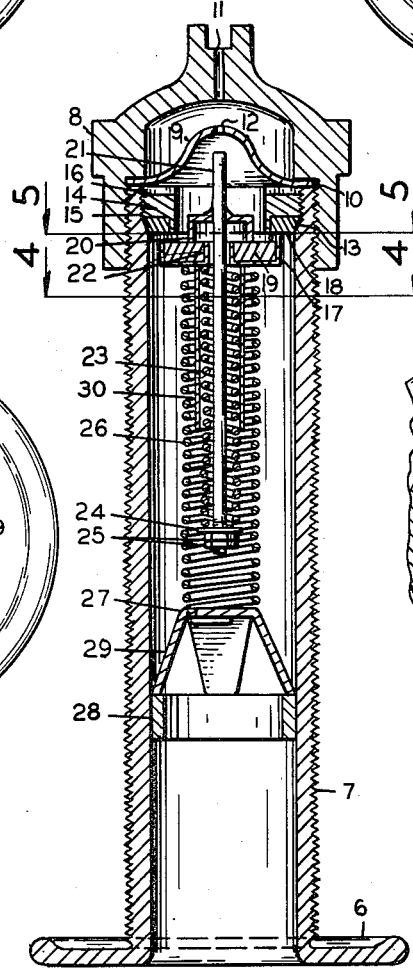
FIGURE 1.
FIGURE 5.
INVENTOR.
EVERET HOLLOWELL
BY Marvin B Davis
ATTORNEY Patented Sept. 2, 1941

2,254,655

UNITED STATES PATENT OFFICE 2,254,655

AUTOMOBILE TIRE PRESSURE RELIEF VALVE

Everet Hollowell, Kansas City, Kans.

Application September 20, 1939, Serial No. 295,720

2 Claims. (Cl. 137—69.5)

This invention relates to improvements in automobile tire valves and more particularly to one that will act as an air inflation valve and an air pressure relief valve.

Heretofore tires of automobiles and road rolling equipment have been known to blow out or have dangerous air inflated pressures due to high temperatures caused by a sudden or gradual rise in atmospheric temperatures or by new tires producing an internal frictional heat probably due to the chemical elements in the walls of the tires when in rolling operation.

An object of the present invention is to provide an improvement in air inflation valves and pressure relief valves to relieve the excess air pressure in a tire above a predetermined point to prevent blowouts and wrecked cars therefrom, the valves and valve seats all being removable from the valve stem for quick replacement.

An object of the present invention is to provide an improved combination air inflation valve and air pressure relief valve with an intake valve and seat, an exhaust valve that seats on said intake valve and a spring with a valve pin that normally holds both valves together.

Another object of the present invention is to provide a valve stem with an intake valve, an exhaust valve co-operating with and seating against the intake valve, the exhaust and intake valve springs bearing against the intake valve, the intake valve spring being confined between a spring seat in the valve stem and the intake valve, a pin being secured to the exhaust valve and passing through the intake valve to compress the exhaust valve spring.

With these and other objects in view my invention further consists in the features of construction illustrated in the accompanying drawing, described in the specification and more particularly pointed out in the appended claims.

In the drawing:

Figure 1 is a fragmentary elevational view illustrating the internal parts of my improved valve stem.

Figure 2 is a fragmentary plan view of Figure 1.

Figure 3 is a fragmentary plan view of Figure 1 with the valve cap and gasket removed.

Figure 4 is a fragmentary sectional plan view taken on line 4—4 of Figure 1.

Figure 5 is a fragmentary sectional plan view taken on line 5—5 of Figure 1.

The valve stem base 6 is of the usual and well known construction and has the usual threaded stem 7 for receiving the valve clamp plate and nut which are not shown because of well known construction, the stem 7 differing from the usual stem by preferably retaining its uniform diameter the full length thereof. A cap 8 internally threaded and receiving a gasket 9 shouldered therein at 10 is screwed on to the stem 7 to close the stem from dust with the exception of the air vents 11 and 12 therein.

An insert sealing valve seat 13 beveled to permanently seat in the stem 7 is held in place by the internal nut 14 threaded at 15, and screwed into stem 7. A groove 16 is made in the internal nut 14 to provide the setting or releasing thereof in the stem 7.

An intake or inflation valve 17 is formed in cup shape with the cylindrical edge thereof seating on insert sealing valve seat 18 which is integral with valve seat 13. The inflation valve 17 has a relief valve insert sealing seat 19 set in the cup shape portion thereof and receives the cylindrical edge of the relief valve 20 which is formed to an inverted cup shape.

The valve 20 is secured to the valve pin 21 by solder, brazing or other means, the pin passing through the hub 22 of the cup 17 and having a compression spring 23 held thereon by the washer 24 and nuts 25. The top end of the spring 23 bears against the cup 17 and thereby normally holds the cylindrical edge valve 20 against the valve seat insert 19.

A compression spring 26 is secured to a seat 27 which is supported on a ring 28 by legs 29, the ring 28 being tightly secured in the stem 7. This ring can be made integral with the tube without departure from my present invention. The top of spring 26 bears against valve cup 17 and normally holds this inflation valve closed. The tube 30 is attached to cup 17 and acts as a spring guide.

It is obvious that when air is forced into the valve stem it will press against the valve cup 20, sealing insert 19, valve cup 17, open the cylindrical edged valve from seat 18 and pass through the stem 7 around the springs 23, 26, and spring seat 27 with legs 29. If too much air pressure is forced into the tire or the tire air pressure is increased beyond the predetermined relief spring capacity the relief cylindrical edged valve 20 will rise from the valve insert seat 19 and exhaust the excess air through the hub 22 of the cup 17.

What I claim as new and desire to secure by Letters Patent is:

1. A tire valve structure comprising a stem interiorly threaded at its outer end, a ported seat plug supported by said threads and having an annular insert surrounding the port and facing the inner end of the stem, a cup-shaped inwardly opening inflation valve disc mounted for rim engagement with the seat insert, a collar supported within the stem at a point remote from said seat plug, a spring seat in engagement with the collar and a compression spring interposed between the valve disc and said spring seat, an air passage through the valve disc and a second annular insert in said valve disc surrounding said air passage, an outwardly opening cup-shaped relief valve member mounted for rim engagement with said second annular insert, a pin on said valve member and projecting through said passage to a point below said valve disc and extending coaxially of said spring, a second compression spring within the first mentioned spring and surrounding said pin, said second spring engaging at one end the said inflation valve disc and at the other end engaging an adjustable abutment on the inner end of said pin.

2. A tire valve structure comprising a stem interiorly threaded at its outer end, a ported seat plug supported by said threads and having an annular insert surrounding the port and facing the inner end of the stem, a cup-shaped inwardly opening inflation valve disc mounted for rim engagement with the seat insert, a shoulder supported within the stem at a point remote from said seat plug, a spring seat in engagement with the shoulder and a compression spring interposed between the valve disc and said spring seat, an air passage through the valve disc and a second annular insert in said valve disc surrounding said air passage, an outwardly opening cup-shaped relief valve member mounted for rim engagement with said second annular insert, a pin on said valve member and projecting through said passage to a point below said valve disc and extending coaxially of said spring, a second compression spring within the first mentioned spring and surrounding said pin, said second spring engaging at one end the said inflation valve disc and at the other end engaging an adjustable abutment on the inner end of said pin.

EVERET HOLLOWELL.